April 21, 1925. 1,534,909
R. C. BROWNE
ELECTRICAL GAUGE
Filed Oct. 10, 1921
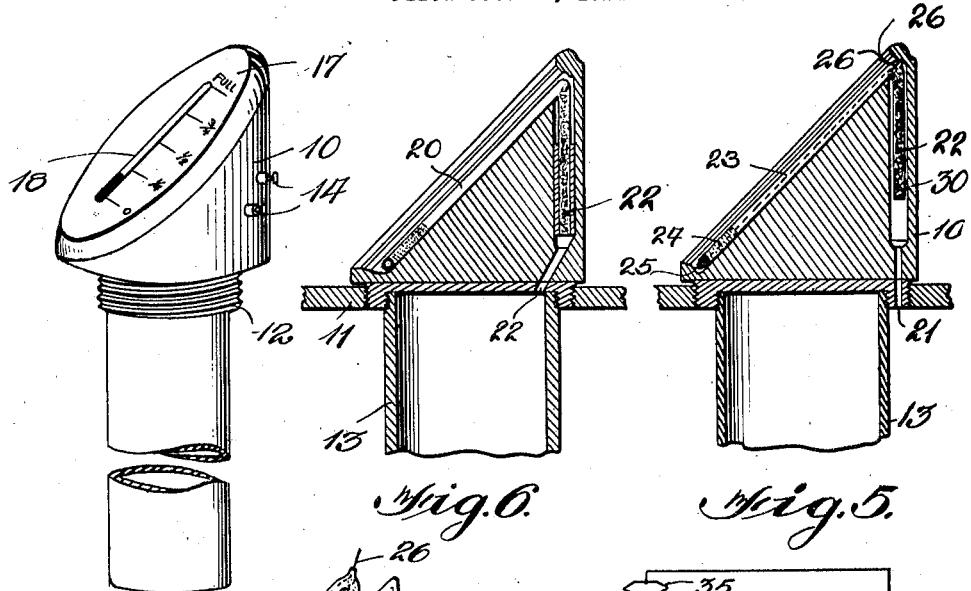
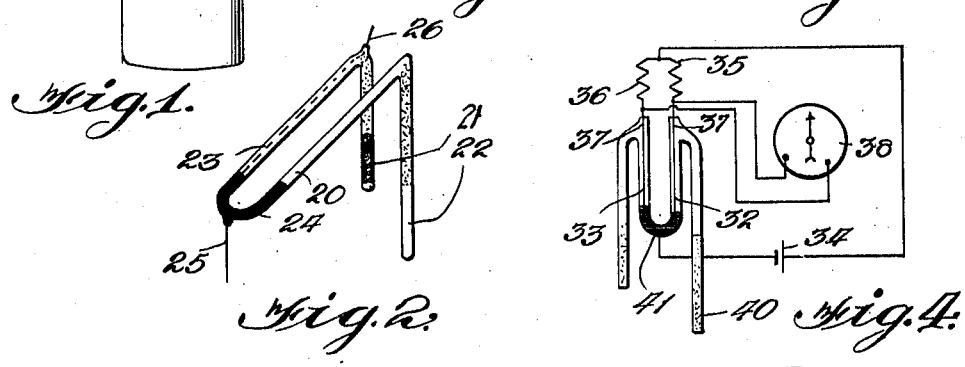
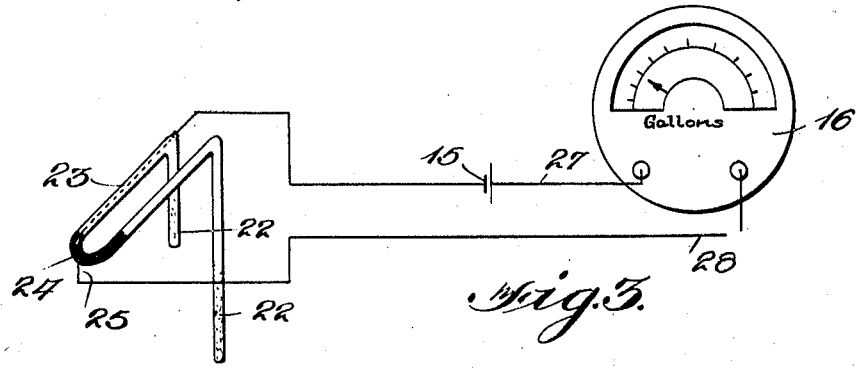
Inventor
Ralph C. Browne
By
Attorney Patented Apr. 21, 1925.

1,534,909

UNITED STATES PATENT OFFICE.

RALPH C. BROWNE, OF SALEM, MASSACHUSETTS.

ELECTRICAL GAUGE.

Application filed October 10, 1921. Serial No. 506,925.

*To all whom it may concern:*

Be it known that RALPH C. BROWNE, a citizen of the United States, residing at Salem, in the county of Essex and State of Massachusetts, has invented certain new and useful Improvements in Electrical Gauges, of which the following is a specification.

This invention relates to improvements in measuring instruments and more particularly to that type of instrument for measuring or determining the amount of liquid contained in a closed receptacle, such, for example, as gauges for gasoline tanks on automobiles and the like. The invention will accordingly be hereinafter described with relation to such application, although it will, of course, be understood that without material modification the instrument is applicable to various other uses.

One of the objects of the present invention is to provide a simple and practical gauge of the above type which will not only indicate at the gauge the relative height of the liquid contents of the receptacle, but will also transmit such information to a remote point, such, for example, as a dial on the instrument board of the vehicle.

A further object is to provide an instrument of the above character having relatively few parts which may be inexpensively manufactured and assembled.

A further object is to provide a gauge for determining the liquid contents of the receptacle, which will be exceedingly accurate as well as reliable, efficient and durable, and unaffected by varying pressure conditions within the receptacle.

Other objects will be in part obvious from the annexed drawings and in part indicated in connection therewith in the following analysis of the invention.

This invention accordingly consists in the features of construction, the combination of parts and in the unique relation of the members and in the relative proportion and disposition thereof, all as more completely outlined herein. To enable others skilled in the art fully to comprehend the underlying features thereof, in order that they may embody the same in numerous modifications in structure and relation contemplated by this invention, drawings depicting the preferred forms have been annexed as part of this disclosure and in such drawings like characters of reference denote corresponding parts throughout all the views, of which—

Figure 1 is a perspective view of the complete device;

Figure 2 is a detail perspective view of one of the elements housed within the casing shown in Figure 1;

Figure 3 is a wiring diagram;

Figure 4 is a wiring diagram of a modification;

Figures 5 and 6 are vertical sectional views, taken substantially through the two portions of the U-shaped member shown in Figure 2, when installed.

Referring now to the drawings in detail, 10 indicates a dial carrying member adapted to be screwed into the wall of a receptacle or tank 11 by means of threads 12, which member is also internally threaded to receive and carry a tubular member 13 dipping down into the liquid contents to the bottom of the receptacle 11. The dial carrying member 10 is provided with binding posts 14, to which wires are attached for completing a circuit through a battery 15 and instrument board dial 16, as shown in Figure 3. Mounted upon the upper or inclined face of the member 10 is a plate 17, provided with a scale 18, having indicating marks, cooperating as hereinafter described, for denoting the height of the liquid within the tank.

In Figure 2, which perhaps best shows the more essential parts of the invention, there is illustrated a U-shaped inclined tube 20 having downwardly extending arms 21 and 22. The inclined portion of the tube 20, as shown in the drawing, is disposed at a small angle from the horizontal, or in other words, from the level of the liquid content of the receptacle 11. The arm 22 communicates with the interior of the tube 13, as shown in Figure 6, while the tube 21 communicates with the outside of this tube 13, but within the interior of the tank, as shown more clearly in Figure 5. The members 10 and 13 are connected by an air tight joint, and it will thus be seen that both ends of the U-shaped tube enter a common receptacle containing the liquid, and it will be clear that pressure, by reason of vapor tension, for example, will be neutralized and not introduce an error in the readings obtained upon the dial, the height of the liquid in the tube 13 being the only governing factor.

The U-shaped tube 20 has sealed therein a filament or wire 23 of relatively high resistance. The wire may be of carbon, iron or platinum, although due consideration for the expense should, of course, be given. The lower portion of the tube 20 has contained therein a small amount of mercury 24 which surrounds a portion of the filament 23, which filament 23 is connected at the points 25 and 26 through suitable glass seals as indicated, with the conductors 27 and 28, one of which includes the battery 15 and the dial 16. This dial 16 may be of a general galvanometer type for indicating a variation in current and the scale proper is preferably marked to read in gallons or other units of liquid measure. Both tubes 21 and 22 are preferably filled with a packing material, such as wooden blocks or cotton 30, which will permit variations in air pressure to be felt within the tube 20, and yet prevent the escape of the mercury 24.

With this description of the construction in mind, it is believed that the operation will be clear. However, a brief statement thereof is as follows: While the tank 11 is being filled the liquid will, of course, pass up through the upper lower end of the tube 13 and cause an increase in air pressure within the U-shaped tube, thereby forcing the mercury 24 from its position of rest at the bottom of the U-shaped tube up the side including the filament 23. The mercury being a better conductor than the filament will, of course, decrease the resistance of the filament and this decrease in resistance will be immediately communicated and indicated upon the dial 16 on the instrument board. The height of the mercury in this part of the U-shaped tube will also be clearly readable upon the dial 17 due to the inclination of the U-tube mounted therein by means of which inclination any displacement of the mercury may be more readily ascertained. In other words, a slight displacement of the pressure in tube 22 will cause a magnified indication of the same in the inclined tube 20. When the tank is completely filled, the air pressure upon the mercury exerted upon the opposite side of the tube will have forced the mercury column well up the opposite side of the U-shaped member until the upper end of the column is opposite the word "full" upon the dial 17.

In Figure 4, there is shown diagrammatically a slightly different arrangement. In this case, two filaments 32 and 33 are made use of, being connected on the Wheatstone-bridge principle, that is, the mercury is connected with one side of a battery 34, the opposite side of the battery being connected to the neutral point of two resistances 35 and 36, which, in turn, connect with the two seals 37 of the filaments 32 and 33, respectively, the two seals being also connected to a galvanometer 38 adapted to be mounted upon the instrument board. In this case, it will be clear that if one arm of the tube, that is, that indicated at 40, is allowed to enter the liquid the position of the mercury 41 will be displaced, resulting in an offsetting of the balance of the bridge and giving a reading on the galvanometer 38 in substantially the manner described, the reading being in terms of liquid measure.

In both modifications, I prefer to imbed the U-shaped tube 20 in the dial carrying member 10 in such a manner that only one arm is shown through the opening, so that an indication of the contents of the tank can be had directly either by looking at the device or at the gauge on the instrument board.

It will thus be seen that the present invention comprises a simple and practical gauge for measuring or indicating the heights of liquid within a tank, as well as simultaneously conveying such information to a relatively remote point. The entire apparatus is of simple and inexpensive construction, as well as reliable and efficient and not likely to get out of order. The entire system can be inexpensively manufactured, assembled and installed on the vehicles, airplanes, motor boats and the like, and without material modification can also be employed on relatively large tanks for indicating the liquid contents thereof.

Without further analysis of the foregoing described invention, the gist of the invention will be so fully revealed that others can, by applying current knowledge, readily adapt it for various applications without omitting certain features that, from the standpoint of the prior art, constitute essential characteristics of the generic or specific aspects of this invention, and, therefore, such adaptations should and are intended to be comprehended within the meaning and range of equivalency of the following claims.

I claim:

1. In a measuring instrument of the character described, in combination, a casing adapted to be mounted upon a liquid receptacle, said casing having its upper face inclined at an acute angle with the horizontal and having a sight opening therein, a tube of a substantially U-shaped construction, communicating with the interior of said receptacle, said tube being mounted in said casing and disposed for a portion of its length at an angle substantially parallel to the upper face of said casing, a quantity of mercury in the bend of said tube responsive to pressure variations caused by the change of liquid level in said receptacle, said tube being positioned in the line of the opening of said casing to thereby permit the displacement of the mercury to be viewed through said sight opening and electrical means partly in said tube and dependent upon the displacement mercury in said tube to indicate at a distance the liquid level in said receptacle.

2. In a measuring instrument of the character described, in combination, a casing adapted to be mounted on a liquid receptacle, said casing having its upper face inclined at an acute angle with the horizontal and having a sight opening therein, a tube of substantially U-shaped construction, communicating with the interior of said receptacle, said tube being mounted in said casing and disposed for a portion of its length at an angle substantially parallel to the upper face of said casing, a resistance material in said tube, a quantity of mercury in the bend of said tube responsive to pressure variations caused by the change of liquid level in the receptacle and effective to thereby vary the resistance of said resistance element, an electrical system connected with said resistance material adapted to indicate the resistance in terms of liquid level at a distance, said tube being positioned in line with the opening of said casing to permit the displacement of the mercury to be viewed through said sight opening.

In testimony whereof I affix my signature.

RALPH C. BROWNE.